United States Patent [19]

Teramura et al.

[11] 4,376,293
[45] Mar. 8, 1983

[54] MAGNETIC DISK RECORDING AND/OR REPRODUCING DEVICE

[75] Inventors: Nobuyasu Teramura; Hiroshi Kobayashi, both of Yokohama, Japan

[73] Assignee: Matsushita Electric Industrial Co., Ltd., Osaka, Japan

[21] Appl. No.: 216,973

[22] Filed: Dec. 16, 1980

[30] Foreign Application Priority Data

Dec. 27, 1979 [JP] Japan .......................... 54-184119[U]

[51] Int. Cl.³ ........................ G11B 17/00; G11B 19/10
[52] U.S. Cl. ......................................... 360/71; 360/86; 360/99; 360/133
[58] Field of Search ...................... 360/71, 99, 97–98, 360/135, 132, 86, 133

[56] References Cited

U.S. PATENT DOCUMENTS 4,040,107 8/1977 Bryer ...................................... 360/99

OTHER PUBLICATIONS

Draft Proposal ISO/DP 6596, American National Standards Institute, dated Oct. 1978, 23 pages.
IBM Tech. Disc. Bull., K. E. Russell et al., Index Amplifier Control for Detecting Diskette in Disk Drive, vol. 22, No. 1, Jun. 1979, pp. 287–300.

Primary Examiner—Alfred H. Eddleman
Attorney, Agent, or Firm—Burgess, Ryan and Wayne

[57] ABSTRACT

A magnetic disk recording and/or reproducing device in which immediately before a flexible magnetic disk is located in the operative position; that is, the disk is mounted on a spindle, a spindle driving circuit is automatically energized so as to spin the spindle and after a predetermined time interval the driving circuit is automatically de-energized, whereby the step for locating and holding the disk in the operative position can be much facilitated, wear of rotating parts can be minimized and the power consumption can be reduced.

4 Claims, 5 Drawing Figures

MAGNETIC DISK RECORDING AND/OR REPRODUCING DEVICE

BACKGROUND OF THE INVENTION

The present invention relates to generally a magnetic disk recording and/or reproducing device and more particularly a means for locating and holding a flexible magnetic disk accurately concentric with the axis of rotation of a spindle.

In the magnetic disk recording and/or reproducing devices, the axis of rotation of a flexible magnetic disk must be maintained in accurate alignment with the axis of rotation of a spindle. Since the peripheral edge of the center aperture or hole of flexible magnetic disks is easily susceptible to be damaged or fractured, utmost care must be taken so that the spindle may be smoothly and accurately fitted into the center aperture. To this end, it is very advantageous to keep the spindle spinning while a flexible magnetic disk is being located. However, keeping the spindle spinning for an unreasonably long time interval results in relatively rapid wear of rotating parts and the increase in power consumption, the latter problem being serious especially when the magnetic recording and/or reproducing devices are battery-powered. It follows, therefore, that when a flexible magnetic disk is located and held accurately concentric with the axis of rotation of the spindle, it is much preferable that the spindle is automatically started spinning and then stopped after a predetermined time interval.

SUMMARY OF THE INVENTION

A first object of the present invention is, therefore, to provide a flexible magnetic disk recording and/or reproducing device in which a flexible magnetic disk can be easily located and held accurately concentric with the axis of rotation of a spindle.

A second object of the present invention is to provide a magnetic disk recording and/or reproducing device in which immediately before a flexible magnetic disk is located and held accurately with the axis of rotation of a spindle, a spindle driving circuit is automatically energized to spin the spindle and then de-energized after a predetermined time interval or after the disk has been positioned in the operative position.

A third object of the present invention is to provide a magnetic disk recording and/or reproducing device which has a long service life and can reduce power consumption to a minimum level.

According to one aspect of the present invention, when a flexible magnetic disk is inserted into guide grooves of the recording and/or reproducing device or when a clamp lever is depressed after a flexible magnetic disk has been inserted into the guide grooves, a spindle driving circuit is automatically energized so that a motor is energized to spin the spindle. As a result, the magnetic disk can be easily located and held accurately concentric with the axis of rotation of the spindle. Thereafter, in response to an output signal from a timer, the driving circuit is automatically de-energized so that the spindle is stopped.

According to one embodiment of the present invention, the timer is energized in response to the output signal generated by a sensor upon detection of the insertion of a flexible magnetic disk into the recording and/or reproducing device. Alternatively, the timer is energized in response to the output signal generated by a sensor upon depression of a clamp lever carrying a clamping means for locating and holding a flexible magnetic disk concentric with the axis of rotation of the spindle. In addition to the detection of a timing for spinning the spindle, the sensor has another function of detecting whether the inserted magnetic disk is a read-only memory or a memory upon which can be recorded fresh data.

The above and other objects, effects and features of the present invention will become more apparent from the following description of a preferred embodiment thereof taken in conjunction with the accompanying drawings.

BRIEF DESCRIPTION OF THE DRAWINGS

Same reference numerals are used to designate similar parts throughout the figures.

DETAILED DESCRIPTION OF THE PRIOR ART

Figure 1:
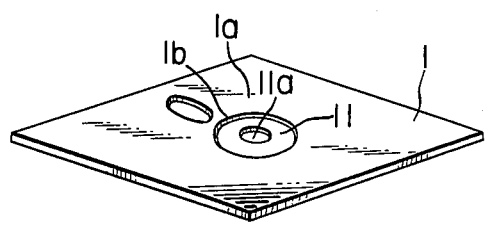
FIG. 1 is a perspective view of a flexible magnetic disk assembly used in the present invention.

Referring first to FIG. 1, a flexible magnetic disk assembly 1 readily available in the market at present consists in general of a flexible magnetic disk 11, which is a magnetic recording medium, and a jacket 1a. The magnetic disk 11 is formed with a center hole 11a and the jacket 1a, with a center aperture 1b.

Figure 2:
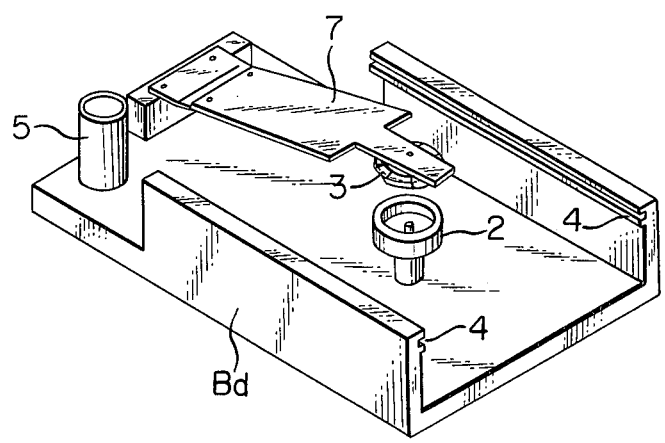
FIG. 2 is a perspective view of a prior art magnetic disk recording and/or reproducing device with its casing and cover removed.
Figure 3:
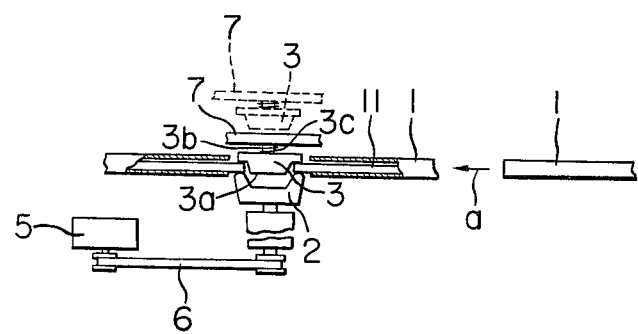
FIG. 3 is a schematic side view thereof used for the explanation of the relationship between a spindle, a flexible magnetic disk assembly and a clamping means.

The disk assembly 1 is inserted into guide grooves 4 of a housing Bd as shown in FIG. 2 and advanced into the direction indicated by the arrow a in FIG. 3. In this case, a spindle 2, which is drivingly coupled with an endless belt 6 to a motor 5, is rotating. When the center hole 11a of the disk 11 is brought immediately above the spinning spindle 2, a clamp lever 7 is depressed from the position indicated by the broken lines to the operative position indicated by the solid lines in FIG. 3, whereby a collet or a locating head 3a of a clamp 3 fits into the center hole 11a of the magnetic disk 11 and clamps the magnetic disk assembly 1 against the spindle 2. (For the sake of simplicity, a means for depressing the clamp lever 7 to and retaining it at the operative position is not shown.) The clamp 3 is biased downward under the force of a bias spring 3b and is adapted to rotate about the axis 3c of rotation in unison with the spindle 2 and the magnetic disk assembly 1. The collet or the locating head 3a of the clamp 3 is in the form of an inverted frustum of circular cone so that it can readily fit into the center hole 11a of the disk 11 and subsequently hold the magnetic disk assembly 1 accurately concentric with the axis of rotation of the spindle 2.

DESCRIPTION OF THE PREFERRED EMBODIMENT

Figure 4:
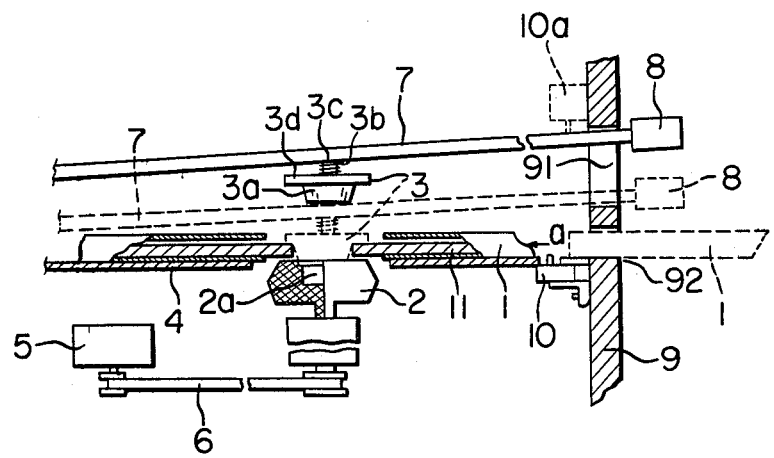
FIG. 4 is a schematic side view, partly in section, of a preferred embodiment of the present invention.
Figure 5:
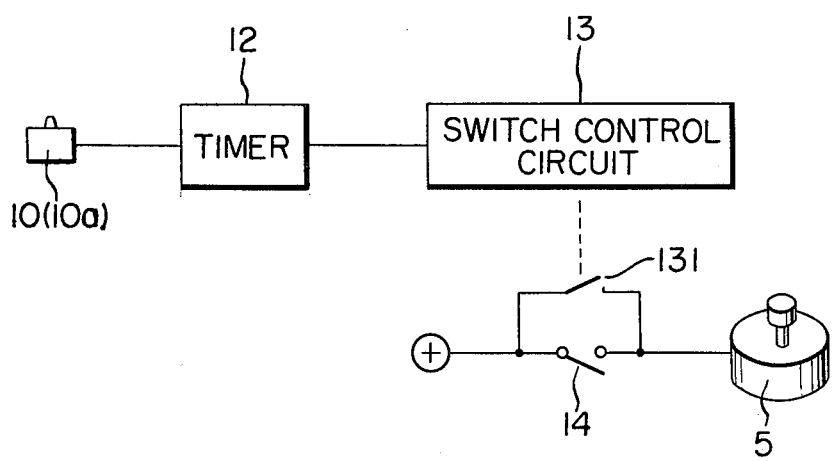
FIG. 5 is a diagram of an electric circuit thereof.

Referring next to FIGS. 4 and 5, a preferred embodiment of the present invention will be described. The housing or casing Bd of the magnetic disk device has a front panel 9 formed with an aperture 91 through which is extended the clamp lever 7 with an operating knob 8 and another aperture 92 through which is inserted the magnetic disk assembly 1 into the guide grooves 4.

When the magnetic disk assembly 1 is advanced in the direction indicated by the arrow a, a sensor 10, which is located at a suitable position in the guide groove 4, detects the insertion of the magnetic disk assembly 1 and generates a detected signal in response to which a timer 12 shown in FIG. 5 is actuated to activate a switch control circuit 13 so as to close a switch 131. As a result, the motor 5 is driven to spin the spindle 2.

When the center hole 11a of the magnetic disk 11 is brought immediately above a center recess 2a of the spindle 2, one depresses the operating knob 8 of the clamp lever 7. Then the clamp 3 is lowered so that the collet or the locating head 3a fits into the center hole 11a of the magnetic disk 11 and engages with the center recess 2a of the spindle 2, whereby the flexible magnetic disk assembly 1 is adjusted accurately with respect to the axis of rotation of the spindle 2. In this case, the clamping flange 3d of the clamp 3 firmly clamps the magnetic disk 11 against the spindle 2. Therefore, the magnetic disk assembly 1 is rotated in unison with the spindle 2 and the clamp 3 as described previously.

After the magnetic disk assembly 1 has been completely mounted on the spindle 2 in the manner described above, the timer 12 delivers the signal to the switch control circuit 13 so that the switch 131 is opened and subsequently the motor 5 and hence the spindle 2 are stopped. To read out the signals or data stored on the magnetic disk 11, a switch 14 is closed to drive the motor 5.

The sensor 10 which, upon insertion of the magnetic disk assembly 1, activates the timer 12 in the manner described above, may be located at a position shown with 10a in FIG. 4 so that when the clamp lever 7 is depressed, the sensor 10a can generate the output signal. The clamping lever 7 may be so arranged that it may be depressed by the swinging motion of a door (not shown) hinged along the upper edge or side of the aperture 91. The sensor 10 may have a dual function of not only detecting the insertion of the magnetic disk assembly 1 but also detecting whether the inserted magnetic disk assembly 1 is a read-only memory or a memory upon which the data can be stored.

In summary, according to the present invention, immediately before the flexible magnetic disk assembly 1 is located and held in position, the spindle 2 is automatically spinned and a predetermined time interval after the disk assembly 1 has been completely positioned, the spindle 2 is automatically stopped. As a result, not only the positioning or holding step of the magnetic disk assembly can be much facilitated but also wear of rotating parts can be minimized and the power consumption can be considerably reduced because the motor and hence the spindle are rotated only for a predetermined time interval.

What is claimed is:

1. A magnetic disk recording and/or reproducing device of the type in which a magnetic disk clamping means locates and holds a flexible magnetic disk accurately concentric with the axis of rotation of a spindle which is spinning, characterized by a sensor means adapted to detect the insertion of a flexible magnetic disk into said recording or reproducing device and generate an output detected signal, a timer means energized in response to said output detected signal from said sensor means and de-energized after a predetermined time interval, and a switching means adapted to be energized in response to an output signal from said timer, thereby closing and opening a drive circuit for driving a motor for spinning said spindle.

2. A magnetic disk recording and/or reproducing device as set forth in claim 1 wherein said sensor means is adapted to detect a flexible magnetic disk when the latter is inserted into an aperture or window of a housing or casing of said recording or reproducing device and to generate an output detected signal in response to which said timer means is energized.

3. A magnetic disk recording and/or reproducing device as set forth in claim 1 wherein said sensor means is adapted to generate an output signal upon depression of a lever carrying said clamping means, and said timer means is energized in response to said output signal from said sensor means.

4. A magnetic disk recording and/or reproducing means as set forth in claim 2 wherein said sensor means includes means responsive to the configuration of the inserted flexible magnetic disk for detecting whether the inserted flexible magnetic disk is a read-only memory or a memory upon which can be stored new data.

* * * * *